US009925517B2

(12) United States Patent
Mora Vallejo et al.

(10) Patent No.: US 9,925,517 B2
(45) Date of Patent: Mar. 27, 2018

(54) PROCESS FOR REDUCING THE CONTENT OF ORGANIC NITROGEN COMPOUNDS FROM HYDROTREATING FEEDSTOCKS FOR ULTRA-LOW-SULFUR DIESEL PRODUCTION

(71) Applicant: INSTITUTO MEXICANO DEL PETROLEO, Mexico City (MX)

(72) Inventors: Rodolfo Juventino Mora Vallejo, Mexico City (MX); J. Ascencion Montoya De La Fuente, Mexico City (MX); Georgina Cecilia Laredo Sanchez, Mexico City (MX); Edith Meneses Ruiz, Mexico City (MX); J. Jesus Castillo Munguia, Mexico City (MX); Beatriz Zapata Rendon, Mexico City (MX)

(73) Assignee: Instituto Mexicano De Petroleo, Mexico City (MX)

( * ) Notice: Subject to any disclaimer, the term of this patent is extended or adjusted under 35 U.S.C. 154(b) by 49 days.

(21) Appl. No.: 15/154,299

(22) Filed: May 13, 2016

(65) Prior Publication Data
US 2016/0332138 A1 Nov. 17, 2016

(30) Foreign Application Priority Data

May 14, 2015 (MX) .................... MX/a/2015/006072

(51) Int. Cl.
*C10G 45/02* (2006.01)
*C10G 67/06* (2006.01)
(Continued)

(52) U.S. Cl.
CPC ........... *B01J 20/226* (2013.01); *B01J 20/281* (2013.01); *B01J 20/2803* (2013.01);
(Continued)

(58) Field of Classification Search
CPC .... B01J 20/226; B01J 20/2803; B01J 20/281; B01J 20/3007; B01J 20/3021;
(Continued)

(56) References Cited

U.S. PATENT DOCUMENTS

2014/0212944 A1* 7/2014 Tian ...................... B82Y 30/00
435/180

\* cited by examiner

*Primary Examiner* — Brian McCaig
(74) *Attorney, Agent, or Firm* — Dickinson Wright, PLLC (57) ABSTRACT

The present invention is related to a selective adsorption process aimed at reducing the content of nitrogen organic compounds (NOC's) that is present in hydrotreating loads (HDT) for the production of ultra-low-sulfur diesel (ULSD below 15 ppm), which is carried out at ambient temperature, atmospheric pressure, without hydrogen, using adsorbing materials with organic metal structure MIL-101-Cr-$M^{X+}$ (MOF MIL-101-Cr-$M^{X+}$), where $M^{X+}$ can be any metal cation such as $Mg^{2+}$, $Al^{3+}$ or $Ti^{4+}$.

Likewise, the present invention considers the preparation of extrudates and the regeneration of the employed MOF adsorbent materials.

In this sense, it is worth noting that the diesel HDT loads to which the present invention is referred to are hydrocarbon currents with distillation temperatures ranging from 150 to 400° C. being preferably Straight Run Gasoil (SRGO), Light Cycle OIL (LCO) and Coker Gasoil (CGO), including their blends, but oil derived fuels can be included: gasoline, diesel and jet fuel, and other hydrocarbon currents obtained from the oil refining processes, which in turn are destined to be loads of the hydrodesulfurization process (HDS) for the production of ultra-low-sulfur diesel.

According to the aforementioned, it is worth mentioning that the present invention process which is the selective adsorption process of nitrogen organic compounds is designed for (Continued)

the pretreatment of loads that enter the HDS process, which increases the catalyst lifespan and improves the economy of the HDS process.

20 Claims, 6 Drawing Sheets

(51) Int. Cl.
| | |
|---|---|
| C10G 25/12 | (2006.01) |
| B01J 20/22 | (2006.01) |
| B01J 20/28 | (2006.01) |
| B01J 20/281 | (2006.01) |
| B01J 20/30 | (2006.01) |
| B01J 20/34 | (2006.01) |
| C10G 25/00 | (2006.01) |

(52) U.S. Cl.
CPC ..... *B01J 20/28066* (2013.01); *B01J 20/3007* (2013.01); *B01J 20/3021* (2013.01); *B01J 20/3042* (2013.01); *B01J 20/3425* (2013.01); *B01J 20/3475* (2013.01); *C10G 25/003* (2013.01); *C10G 25/12* (2013.01); *C10G 45/02* (2013.01); *C10G 67/06* (2013.01); *B01J 2220/44* (2013.01); *B01J 2220/54* (2013.01); *C10G 2300/1055* (2013.01); *C10G 2300/202* (2013.01)

(58) Field of Classification Search
CPC .......... B01J 20/3042; B01J 20/3425; B01J 20/3475; C10G 25/003; C10G 25/12; C10G 45/02; C10G 67/06
See application file for complete search history.

PROCESS FOR REDUCING THE CONTENT OF ORGANIC NITROGEN COMPOUNDS FROM HYDROTREATING FEEDSTOCKS FOR ULTRA-LOW-SULFUR DIESEL PRODUCTION

TECHNICAL FIELD

The present invention is related to a selective adsorption process aimed at reducing the content of nitrogen organic compounds (NOC's) that is present in hydrotreating loads (HDT) for the production of ultra-low-sulfur diesel (ULSD below 15 ppm), which is carried out at ambient temperature, atmospheric pressure, without hydrogen, using adsorbing materials with organic metal structure MIL-101-Cr-$M^{X+}$ (MOF MIL-101-Cr-Mx$^{X+}$), where $M^{X+}$ can be any metal cation such as $Mg^{2+}$, $Al^{3+}$ or $Ti^{4+}$.

(MOF: Metal Organic Framework and MIL: Material of Institute Lavoisier).

Likewise, the present invention considers the preparation of extrudates and the regeneration of the employed MOF adsorbent materials.

In this sense, it is worth noting that the diesel HDT loads to which the present invention is referred to are hydrocarbon currents with distillation temperatures ranging from 150 to 400° C. being preferably Straight Run Gasoil (SRGO), Light Cycle OIL (LCO) and Coker Gasoil (CGO), including their blends.

According to the aforementioned, the selective adsorption process of NOCs is designed for the pretreatment of loads that enter the Hydrodesulfurization Process (HDS), and exert a positive effect on the reduction of the severe conditions under which the HDS process takes place, thus increasing the catalyst lifespan and improving the economy of the HDS process.

BACKGROUND

Currently, there is great interest in the desulfurization and denitrogenation of gasoil destined for the production of diesel for the natural compounds of sulfur and nitrogen present in gasoil are transformed by means of combustion into $SO_x$ and $NO_x$, which are the main sources of acid rain and air pollution. In order to face the challenge of producing fuels with low sulfur and nitrogen contents, the refining industry uses hydrodesulfurization catalytic processes (HDS) and simultaneously hydrodenitrogenation (HDN), which use harsh conditions and consume high hydrogen amounts.

It is well known that the nitrogen organic compounds (NOCs) present in the Straight Run Gasoil (SRGO), Light Cycle OIL (LCO) and Coker Gasoil (CGO) loads exert an inhibiting effect on the catalytic activity of HDS reactions, especially from heteromolecules with high steric impediments and high HDS refractory characters like alkyl-dibenzothiophenes such as 4,6-DMDBT. The NOC's compete with the sulfur organic compounds for the active sites of the catalysts used in the HDS process, poisoning them, which leads, on the one hand, to use huge catalyst volumes, and on the other hand, to establish highly severe reaction conditions in order to keep the conversion and selectivity levels, which reduces significantly the lifespan of the catalysts, affecting considerably the economy of the production process of ultra-low-sulfur diesel (ULSD below 15 ppm).

The production of fuels, according to the European Union Environmental Norms established for 2005, requires the reduction of the sulfur amount in diesel and gasoline at levels that are equal or below 10 parts per million weight (ppmw). For example, in Germany, the reduction of the sulfur amount in gasoline and diesel up to 10 ppmw was proposed in 2005 whereas in the United States of America the norm for the maximum sulfur content in diesel is limited to 15 ppmw from 2006.

In the case of Mexico, PEMEX Refining, honoring its commitment to produce and distribute diesel and gasoline that follow the environmental legislations under international quality standards, is adjusting its gasoline and diesel production parameters under the Mexican norm NOM-086-Semamat-Sener-SCFI-2005, which sets a maximum sulfur content in diesel of 15 ppmw.

Therefore, for the production of ultra-low-sulfur diesel, it is necessary that the HDS process have an efficiency rate above 99.9% in the reduction of sulfur organic compounds present in the hydrocarbon blend, where benzothiophenes and alkyl-dibenzothiophenes are found.

Various studies have shown that the HDS catalytic reaction is significantly inhibited by the NOCs. A competitive adsorption process among the nitrogen and sulfur compounds for the catalyst active sites occur, which provokes that the nitrogen compounds poison the HDS catalysts. The inhibition extent depends on the type and concentration of NOC's. In HDS feedstocks consisting of SRGO, the average content of total organic nitrogen is from 100 to 300 ppm whereas in heavier currents such as LCO, the total nitrogen content is above 500 ppm (Georgina C. Laredo et al., *Nitrogen compounds characterization in atmospheric gas oil and light cycle oil from a blend of Mexican crudes. Fuel* 81 (2002) 1341-1350).

Some researchers have studied the poisoning effect on HDS catalysts by NOC's, finding that even 3-ethylcarbazole traces could have an enormous effect on the HDS of 4,6-diethyldibenzothiophene because the alkyl carbazoles, in spite of being very difficult to react with, the could be adsorbed and block the active sites of the HDS catalyst.

Due to the aforementioned, an attractive technological alternative that has been proposed to solve these problems is the use of a pretreatment process for the reduction of NOC's from the HDS currents; the alternative consists of the use of physical adsorption methods at ambient temperature for the selective removal of NOC's. In order to an adsorption process to be a viable technological alternative, various characteristics are required to be met, where the following are the most important: ambient temperature, atmospheric pressure, no hydrogen use, use of adsorbents with high Intrinsic adsorption capacity, highly selective towards NOC's and easily regenerated.

Among some of the technologies that have been developed for the removal of NOC's by means of the adsorption process, the process reported in the U.S. Pat. No. 6,248,230 B1, Jun. 19, 2001, Min et al., Method for manufacturing cleaner fuels is found. In this process, the use of solid adsorbents that include activated alumina, acid white clay, Fuller's earth, activated carbon, zeolite (type not specified), cation exchange resins, hydrated alumina and silica gel is reported. During the research process to select the materials, it was found that the most suitable one was silica gel with a pore diameter from 40 to 200 Å, specific surface from 100 to 1,000 m²/g and pore volume from 0.5 to 1.5 cc/g.

This enterprise developed a demonstration plant to treat 1,000 B/D, using a combination of adsorbent materials such as silica gel and ionic exchange resins. As for the regeneration process of the adsorbents, the patent reports on the use of a non polar solvent (n-hexane) for the first step, and afterwards, the use of a highly polar solvent which is methyl tert-butyl ether (MTBE).

In the patent request US 2010/0300935 A1, Dec. 2, 2010, Nicolaos et al., Process for desulfurization and denitration of a gas-oil-type hydrocarbon fraction that contains nitrogen compounds, a process for the desulfurization and denitrogenation of a fraction of gasoil-type hydrocarbons containing nitrogen compounds is described. The HDS process is preceded by an adsorption unit of nitrogen compounds that inhibit the HDS reactions. The adsorbents for which the process was designed were selected among the families of ionic exchange resins, activated carbons, silicas, aluminas, zeolites, metal oxides or reduced metals, being also possible the use of mixtures of solids belonging to any of the previously mentioned various families.

Preferably, an adsorbent belonging to the zeolite family is used, and more specifically, a solid adsorbent consisting of faujasite-type zeolites, X or Y, with an atomic Si/Al ratio above 1. As for the regeneration process, it is performed through the treatment of the exhausted adsorbent with a current of already-treated gasoil (with a very low nitrogen and sulfur concentration) in order to adsorb the nitrogen and sulfur compounds retained in the adsorbent; the treatment temperature is 180° C.

In the patent request US 2009/0107882 A1, Apr. 30, 2009, Zheng et al., Adsorbents for denitrogenation desulfurization of hydrocarbon oils and methods of producing, a series of adsorbents, their synthesis procedure and use to adsorb CONs and sulfur organic compounds present in vehicle fuels at ambient temperature and atmospheric pressure are described. The adsorbents are based on transition metal phosphides which can be or not supported on zeolites, titania or alumina; an example of these materials are the $NiP/TiO_2$ and $WP/TiO_2$—$ZrO_2$ systems.

The present invention differs from patent documents U.S. Pat. No. 6,248,230 B1, US 2010/0300935 A1 and US 2009/0107882 A1, in both the type of employed adsorbent materials and the preparation of extrudates and the regeneration of the used adsorbent materials. In this sense, it is important to point out that the process of the present invention is a viable technological alternative to reduce the content of NOC's present in the diesel HDT loads at ambient temperature and atmospheric pressure without using hydrogen by means of adsorbent materials that showed high intrinsic adsorption capacity and selectivity towards NOC's, in addition to be easily regenerated.

Additional materials that have been reported for this purpose are silica gel, copper zeolites, acceptor materials, methyl viologen aluminosilicates (MV-AS), exhausted FCC catalysts, activated alumina (AA), activated carbon (AC) and mesoporous molecular sieves (MMSs).

Recently, it has been reported that the materials with metal organic frameworks (MOF: Metal Organic Framework) that develop surface areas from 3,000 to 10,000 $m^2/g$, depending on their porous structure, have great possibilities to be applied in various fields such as catalysis, gas storage and separation processes.

The MOF MIL-101-Cr (MIL: Material of Institut Lavoisier) showed itself to be capable of removing nitrogen organic compounds from liquid hydrocarbon currents, SRGO, LCO and model blends, Alexey L. Nuzhidin et al., *Removal of nitrogen compounds from liquid hydrocarbon streams by selective sorption on metal-organic framework MIL-101. Mendeleev Commun.*, 2010, 20, 57-58. This MOF has the property of developing a specific surface of up to 5,900±300 $m^2/g$; in the adsorption tests, it was found that it is capable of adsorbing 9.0 mg of nitrogen/g of adsorbent from a SRGO that contained 131 mg of nitrogen/kg of SRGO.

Afterwards, a comparative study of the adsorption capacity of the series of mesoporous metal methylcarboxilates, MOFs with different topologies and compositions was carried out; MIL-100(Fe), MIL-100(Cr), MIL-100(Al), MIL-101(Cr), $[Cu_3(BTC)_2]$, CPO-27Ni, CPO-27(Co) and MIL-47/MIL-53 with model blends from a series of nitrogen compounds: indole, 2-methylindole, 1,2-dimethylindole, carbazole, and N-Methylcarbazole dissolved in toluene/n-heptane blends, Michael Maes et al., *Selective Removal of N-Heterocyclic Aromatic Contaminants from Fuels by Lewis Acidic Metal-Organic Frameworks. Angew. Chem. Int. Ed.* 2011, 50, 4210-4214.

Such study reported that the MOFs MIL-100 and MIL-101 are the most promising to adsorb nitrogen compounds selectively, considering the presence of sulfur organic compounds whereas the $[Cu_3(BTC)_2]$, CPO-27N, and CPO-27 (Co) materials adsorb both nitrogen and sulfur compounds.

According to Imteaz Ahmed et al, *Adsorptive denitrogenation of model fuels with porous metal-organic frameworks (MOFs): Effect of acidity and basicity of MOFs, Applied Catalysis B: Environmental,* 129 (2013) 123-129, an acidic functionalized MOF AMSA MIL-100 (Cr) can help to the selective removal of certain slightly basic compounds such as sulfur compounds, mainly when they are present at low concentrations, due to basic acid interactions, however, it is not useful to increase the adsorption of neuter compounds such as indole.

The materials employed in the present invention are adsorbent materials with metal organic framework MIL-101-Cr-$M^{X+}$, where $M^{X+}$ can be any metal cation such as $Mg^{2+}$, $Al^{3+}$ or $Ti^{4+}$, materials with high crystallinity and high surface area with the metal cation highly dispersed. This type of MOF has a zeolite-type structure, which consists of two-cavity-quasi-spherical cages (2.9 and 3.4 nm) accessible through 1.2- and 1.6-nm windows. These materials have high surfaces and pore volumes (in general from 3,200 to 3,900 $m^2/g$ and from 1.4 a 2.1 cc/g, respectively), they also have very good resistance to common solvents and thermal stability (Fe-MIL-101 up to 180° C. and Cr-MIL-101 up to 300° C.). The MIL-101 structure consists of terephthalate radicals that work as ligands of methyl $M_3O$-carboxilate trimers (M=Fe or Cr). These metal ions display an octahedral coordination with water molecules at bond ends. It has been reported that the water molecules (two water molecules per trimeric group according to elemental and thermogravimetric analyses) can be easily eliminated by means of a thermal treatment under vacuum, thus providing coordinatively unsaturated, catalytically active sites (Young Kyu Hwang et al., *Selective sulfoxidation of aryl sulfides by coordinatively unsaturated metal centers in chromium carboxylate MIL-101. Applied Catalysis A: General* 358 (2009) 249-253).

Therefore, there is a great need for having adsorbent materials capable of removing NOC's selectively from SRGO, LCO, CGO currents and their blends at atmospheric pressure, ambient temperature without hydrogen consumption, in addition to be easily regenerated.

The use of this type of materials either as adsorbents or any other technological application becomes difficult because these materials, when synthesized, are obtained as powders. For a viable technological application such as their use in continuous processes of the fixed-bed-column type (FBC) or any other related process, in adsorption operations of gases such as hydrogen and $CO_2$ or in selective adsorption processes of N and S heteromolecules in fixed bed, it is necessary to form extrudates.

These materials have been extrudated by means of eccentric presses and certain binders that can be: titanium dioxide and hydrated titanium dioxide (U.S. Pat. No. 5,430,000, Jul. 4, 1995. Timken, Method for preparing titania-bound zeolite catalysts), hydrated alumina and other aluminas (WO 94/29408, Dec. 22, 1994. Keville et al., Process for preparing an alumina bound zeolite catalyst), mixtures of alumina and silicon compounds (WO 94/13584, Jun. 23, 1994. Miller, Preparation of aluminosilicate zeolites), silicon compounds (EP 0 592 050 B1, Apr. 10, 1996. Klazinga et al., Process for extruding crystalline aluminosilicates), clays, alkoxysilanes (EP 0 102 544 81, Jun. 1, 1988. Hoelderich et al., Process for the production of hard fracture-resistant catalysts from zeolite powder), amphiphilic materials and graphite (U.S. Pat. No. 6,893,564 B2, May 17, 2005. Mueller et al., Shaped bodies containing metal-organic frameworks).

For this purpose, various patents have been presented: the U.S. Pat. No. 7,931,960 B2, Apr. 26, 2011, Hesse et at, Shaped bodies containing metal-organic frameworks shows a process where MOF tablets are prepared and molded from 1 to 16 mm in size, displaying good surface characteristics and mechanical resistance. These materials are prepared by means of an eccentric press Korsh (EKO type) from a MOF mixture (99.8%) with graphite (0.2%). The procedure is carried out under nitrogen atmosphere. In one of the examples, from a MOF-5 with BET area of 1,796 $m^2/g$ as powder, extrudates with 3-4.5 mm in diameter and 3 mm in length with BET areas of 1,532, 1,270 and 1,137 $m^2/g$ at applied pressures of 10, 28 and 51 N, respectively, were obtained.

Gregory W. Peterson et al. (*Effects of pelletization pressure on the physical and chemical properties of the metal-organic frameworks $Cu_3(BTC)_2$ and UiO-66, Microporous and Mesoporous Materials, Volume* 179, 15 Sep. 2013, Pages 48-53, http://dx.doi.org/10.1016/j.micromeso.2013.02.025), prepared extrudates following a method similar to the one reported in the U.S. Pat. No. 7,931,960 B2.

The technique state known by the applicant, represented mainly by the technologies described in the referred patent documents, is surpassed by the present invention, for such technique state refers in general terms to the use of MOFs in the reduction of nitrogen organic compounds (NOCs), but none specifically to the adsorbent materials with organic metal structure MIL-101-Cr-$M^{X+}$ (MOF MIL-101-Cr-$M^{X+}$), where $M^{X+}$ can be any metal cation such as $Mg^{2+}$, $Al^{3+}$ or $Ti^{4+}$, to reduce the NOC's present in hydrotreating (HDT) loads for the production of ultra-low-sulfur diesel (ULSD below 15 ppm).

The diesel HDT loads, to which the present invention is referred, are hydrocarbon currents with distillation temperatures ranging from 150 to 400° C., preferably Straight Run Gasoil (SRGO), Light Cycle OIL (LCO) and Coker Gasoil (CGO), including their blends, but oil derived fuels can be included: gasoline, diesel and jet fuel, and other hydrocarbon currents obtained from the oil refining processes, which in turn are destined to be loads of the hydrodesulfurization process (HDS) to produce ultra-low-sulfur diesel.

Thus, an item of the present invention is to provide a selective adsorption process to reduce the content of NOC's present in the diesel HDT loads, which takes place at ambient temperature, atmospheric pressure and without using hydrogen by means of adsorbent materials with organic metal structure MIL-101-Cr-$M^{X+}$ (MOF MIL-101-Cr-$M^{X+}$), where $M^{X+}$ can be any metal cation such as $Mg^{2+}$, $Al^{3+}$ or $Ti^{4+}$.

An additional item of the present invention is to provide a selective adsorption process to reduce the content of NOC's present in diesel HDT loads, which considers the preparation of extrudates for a viable technological application such as their use in continuous processes of the fixed-bed-column type (FBC) or any other related process.

Another additional item of the present invention is to provide a selective adsorption process to reduce the content of NOC's present in diesel HDT loads, which considers the regeneration of the used adsorbent MOF materials.

The aforementioned and other items of the present invention will be established more clearly and in detail in the following chapters.

DETAILED DESCRIPTION

The present invention is related to a selective adsorption process aimed at reducing the content of nitrogen organic compounds (NOC's) present in hydrotreating (HDT) loads to produce ultra-low-sulfur diesel (ULSD below 15 ppm) at ambient temperature, atmospheric pressure and without hydrogen, using adsorbing materials with organic metal structure MIL-101-Cr-$M^{X+}$ (MOF MIL-101-Cr-$M^{X+}$), where $M^{X+}$ can be any metal cation such as $Mg^{2+}$, $Al^{3+}$ or $Ti^{4+}$.

(MOF: Metal Organic Framework and MIL: Material of Institute Lavoisier).

Likewise, the present invention considers the preparation of extrudates and the regeneration of the used MOF adsorbing materials.

In this sense, it is worth noting that the diesel HDT loads, to which the present invention is referred, are hydrocarbon currents with distillation temperatures ranging from 150 to 400° C., preferably Straight Run Gasoil (SRGO), Light Cycle OIL (LCO) and Coker Gasoil (CGO), including their blends, but oil derived fuels can be included: gasoline, diesel and jet fuel, and other hydrocarbon currents obtained from the oil refining processes, which in turn are destined to be loads of the hydrodesulfurization process (HDS) to produce ultra-low-sulfur diesel.

For this reason, the selective adsorption process of NOC's is designed for the pretreatment of loads that enter the Hydrodesulfurization Process (HDS), and exert a positive effect on the reduction of the severe conditions under which the HDS process takes place, thus increasing the catalyst lifespan and improving the economy of the HDS process.

The adsorbing materials MOF MIL-101-Cr-$M^{X+}$ (MOF MIL-101-Cr-$M^{X+}$), where $M^{X+}$ can be any metal cation such as $Mg^{2+}$, $Al^{3+}$ or $Ti^{4+}$, are highly crystalline materials with high surface area and a highly dispersed metal cation, which are properties that contribute significantly to the selective adsorption process featured in the present invention to reduce the content of NOC's at ambient temperature and atmospheric pressure due to the higher affinity of NOC's for the solid medium (MOF MIL-101-Cr-$M^{X+}$) with respect to the present hydrocarbons.

Figure 1:
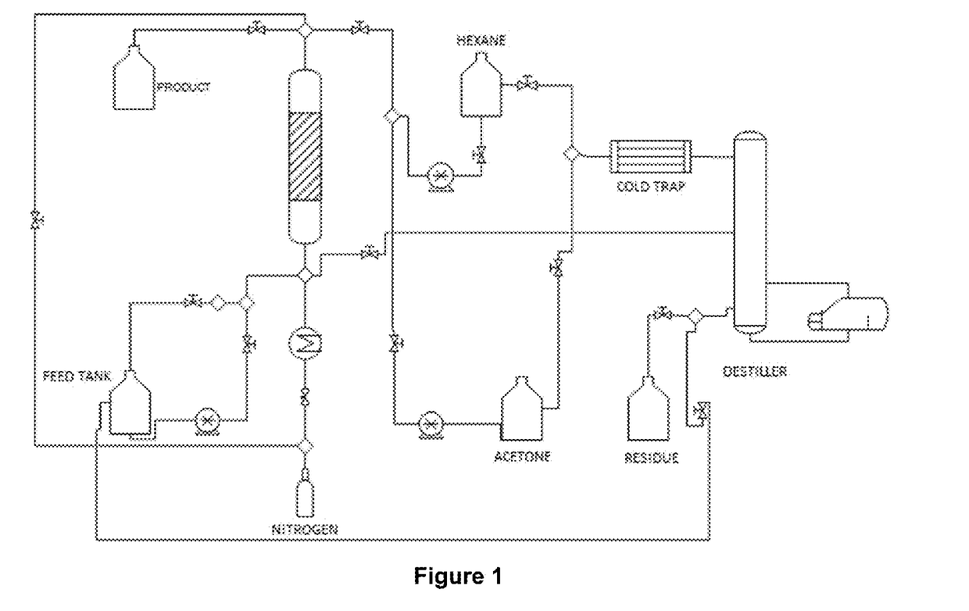
FIG. 1. Continuous flow adsorption process through a fixed-bed column consisting of MOF MIL-101-Cr-$M^{X+}$ extrudate materials, where $M^{X+}$ can be any metal cation such as $Mg^{2+}$, $Al^{3+}$ or $Ti^{4+}$.

The selective adsorption process of the present invention takes place either by batches, vigorous stirring of the MOF MIL-101-Cr-$M^{X+}$ powder or by means of a continuous-flow-adsorption process through a fixed-bed column using MOF MIL-101-Cr-$M^{X+}$ extrudates (FIG. 1)

The cubic structure of the MOF MIL-101-Cr-$M^{X+}$ materials ($a_o$=8.9 nm) displays various unprecedented characteristics: mesoporous-zeolite-type structure, giant cell volume (702 $nm^3$), pore sizes from 2.9 to 3.4 nm, pore volume from 1.27 to 2.06 cc/g and BET specific surface area from 2,600 to 3,000 $m^2/g$.

The MOF MIL-101-Cr-$M^{X+}$ materials, once synthesized, are powders (FIG. 2) that can be used in batch adsorption processes, however, in order to perform a more efficient process, it is necessary to carry it out in a fixed bed. The fixed-bed processes require the use of extrudates (FIG. 3), for the use of powders in these systems provokes blocking problems and, as a consequence, important pressure drops.

The extrusion of the MOF MIL-101-Cr-$M^{X+}$ materials includes the pelletizing of MOF powder and its mixture with long-chain-organic binders such as Carboxymethylcellulose (CMC), Hydroxyethylcellulose, Xanthan gum and, in general, polysaccharide-type compounds, among others, to obtain extrudates in the physical form of cylinders or spheres with physical and mechanical properties necessary for their use in fixed-bed-column-type-continuous processes (FBC) or any other related process.

In addition, the present invention process includes the regeneration of the used MOF adsorbing materials by means of a light hydrocarbon wash, non-polar $C_3$-$C_8$, followed by the in situ extraction at ambient temperature with polar solvents such as ketones, alcohols or amides. The regenerated materials display a higher adsorption capacity with respect to other materials usually used in the HDT processes.

The present invention process consists of the following stages:
  I. The preparation of extrudates, preferably in the physical form of cylinders or spheres (FIG. 3) with BET surface specific area from 2,600 to 3,000 $m^2/g$ with mesoporous, physical and mechanical properties necessary for their use in fixed-bed-column-type-continuous processes (FBC) or any other related process from the powdered adsorbent materials (FIG. 2): MOF MIL-101-Cr-$M^{X+}$, where $M^{X+}$ can be any metal cation such as $Mg^{2+}$, $Al^{3+}$ or $Ti^{4+}$;
  II. The use of MOF MIL-101-Cr-$M^{X+}$ adsorbing materials in the form of extrudates (FIG. 3) for selective adsorption at ambient temperature, atmospheric pressure and without hydrogen to reduce the content of nitrogen organic compounds (NOC's) present in the diesel hydrotreating (HDT); and
  III. The regeneration of the used MOF MIL-101-Cr-$M^{X+}$ adsorbing materials.

Figure 2:
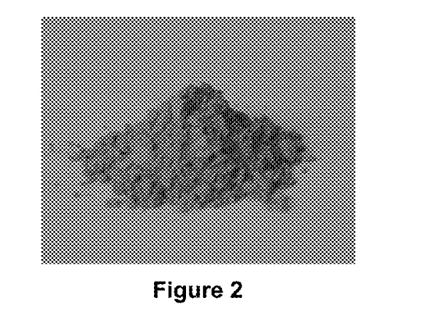
FIG. 2. Powdered MOF material MIL-101-Cr—$Mg^{2+}$ as obtained after synthesis.

Detailed description of each mentioned stage:
I. The preparation of extrudates, preferably in the physical form of cylinders or spheres (FIG. 3), with BET specific surface area from 2,600 to 3,000 $m^2/g$, and mesoporous, physical and mechanical properties necessary for their use in continuous processes of the fixed-bed-column type (FBC) or any other related process from powdered adsorbent materials (FIG. 2). The MOF MIL-101-Cr-$M^{X+}$ preparation process consists of:
  a) Grinding of MOF MIL-101-Cr-$M^{X+}$ powder (solid) obtained from the metal-organic synthesis until the production of fine particles;
  b) Addition of a long-chain-organic binder to the ground MOF MIL-101-Cr-$M^{X+}$, preferably from 4 to 8 wt. % of binders such as Carboxymethylcellulose (CMC), Hydroxyethylcellulose, Xanthan gum and, in general, polysaccharide-type compounds, preferably (CMC), and homogenization of the solid mixture;
  c) Peptization of the solid mixture homogenized with water, preferably bidistilled water, in a ratio from 1.3 to 1.7 ml/g of solid mixture, preferably from 1.4 to 1.6 ml/g;
  d) Introduction of the obtained homogeneous paste into the extruding recipient;
  e) Setting of the angular velocity of the rotors in the extruding recipient, preferably from 20 to 30% of the maximum velocity;
  f) Slow performance of the extrusion process until using all the material in process, obtaining extrudates preferably with a diameter from 0.8 to 1.3 mm;
  g) Drying of the material obtained in the form of extrudates at temperatures from 100 to 140° C. for 10 to 14 hours; and
  h) Sieving of the obtained extrudates at the desired size, preferably from 1 to 2 mm in length.
II. The use of MOF MIL-101-Cr-$M^{X+}$ adsorbing materials in the form of extrudates (FIG. 3) in selective adsorption at ambient temperature, atmospheric pressure and without using hydrogen to reduce the content of nitrogen organic compounds (NOC's) consists of:
  a) Activation of the MOF MIL-101-Cr-$M^{X+}$ material loaded in the adsorption-plant column in the form of extrudates using a convection oven with a nitrogen current flow from 10 to 100 ml/min, preferably from 50 to 60 ml/min, through the column, starting the oven heating program until reaching temperatures from 110 to 130° C., keeping it for 4 to 12 hours in order to remove humidity and volatile adsorbent impurities; afterwards, the material is cooled down until reaching temperatures from 20 to 30° C. in order to start the adsorption; and
  b) Feeding of the load to be treated, using ascending or descending flow, to the packed column using a peristaltic pump with a space velocity (LHSV) of up to 12 $h^{-1}$, preferably from 0.5 to 1.5 $h^{-1}$; periodic recollection of the effluent at the exit of the packed column and analysis of total nitrogen corresponding to the recollected fractions.

III. The regeneration of the used MOF MIL-101-Cr-$M^{X+}$ adsorbing materials consists of:
   a) Drainage of the packed column effluent;
   b) Non-polar solvent extraction, preferably from $C_3$ to $C_8$, thus recovering, after separating the solvent by distillation, from 9 to 11% in volume from the treated load at the adsorption stage and returning this recovered fraction to the load tank of the adsorption process; the used solvent/adsorption ratio is from 3 to 7 ml/g;
   c) In situ extraction at ambient temperature with polar solvents such as ketones, alcohols or amides, preferably acetone, with a solvent/adsorbent ratio from 5 to 15 ml/g; after separating the polar solvent by distillation, a residue from 0.8 to 1.3% in volume of the treated load at the adsorption stage with a total nitrogen content from 2 to 3 wt. %; and
   d) Column drying to eliminate the solvent residues, passing a nitrogen flow, preferably dry, at temperatures from 80 to 120° C., until eliminating completely the polar solvent.

In this sense, it is important to point out that the diesel HDT loads without being treated with the present invention, which have on average from 250 to 500 ppm of $N_{total}$ and from 10,000 to 25,000 ppm of $S_{total}$, when fed to the HDS process, produce diesel with more than 300 ppm of $S_{total}$ at a reaction temperature of 330° C. whereas the diesel HDT loads treated with the present invention, which have on average from 50 to 100 ppm of $N_{total}$ and from 10,000 to 25,000 ppm of $S_{total}$, when fed to the HDS process, generate a ULSD with less than 15 ppm of $S_{total}$ at reaction temperatures below 330° C.

The aforementioned confirms that the present invention process of selective adsorption of nitrogen organic compounds, designed for pretreating the load that enters the HDS process, impacts positively on the reduction of the harsh conditions at which the HDS process takes place, increasing the catalyst lifespan and improving the economy of the HDS process.

EXAMPLES

What follows is the description of some practical examples to provide a better understanding of the present invention without limiting its scope.

Example 1

Activation Process of the Adsorbent MOF MIL-101-Cr Synthesized Using Propylene Oxide as Material Mesoporosity Promoter for the Adsorption Process.

The purpose of the adsorbent activation is to reach the maximum intrinsic adsorption capacity of the material:
   At first, one gram of adsorbent was placed into a vial or recipient destined to perform the adsorption process of NOC's for hydrotreatment (HDT) loads;
   Shortly after, the material was placed in an oven and heated at 120° C. for 12 hours, time at which the material lost 5 wt. %, derived from the humidity loss; and
   Afterwards, the temperature fell to 30° C. to perform the selective adsorption process of NOC's.

Example 2

With the adsorbing material MOF MIL-101-Cr, synthesized using Propylene Oxide as material mesoporosity promoter, in its original powder state (FIG. 2) and activated as described in Example 1, the following adsorption capacity test at equilibrium was carried out:
   1.0 g of adsorbent material and 15 ml of SRGO were mixed (285 mg $N_{total}$/Kg de GLP);
   The mixture was stirred for 90 minutes at ambient temperature and afterwards was left to rest;
   A sample of the supernatant gasoil was taken and analyzed using a piece of equipment Chemiluminescence model Antek Multitek to establish the total Nitrogen content; and
   The result was a reduction of the Nitrogen content in the SRGO at equilibrium of 97.5%, showing an adsorption capacity of 2.9 mg of $N_{total}$/g of adsorbent.

Example 3

With the adsorbing material MOF MIL-101-Cr—$Mg^{2+}$ synthesized like MOF MIL-101-Cr from Example 2 and incorporating $Mg^{2+}$ as Magnesium Ethoxide from the synthesis, and activated as described in Example 1, the equilibrium adsorption capacity test was carried out following the same methodology from Example 2, using a mixture of 95% of SRGO and 5% of LCO, with a $N_{total}$ content of 293 mg of $N_{total}$/Kg.

The result was a reduction of Nitrogen content in the equilibrium mixture of 92.3%, showing a capacity adsorption of 2.9 mg of $N_{total}$/g of adsorbent.

Example 4

With the adsorbing material MOF MIL-101-Cr—$Mg^{2+}$ from Example 3, activated as described in Example 1, the equilibrium adsorption capacity test was carried out following the same methodology from Example 2, using a mixture of 85% of SRGO and 15% of LCO, with a $N_{total}$ content of 309 mg/Kg.

The result was a reduction of Nitrogen content in the equilibrium mixture of 90.1%, showing a capacity adsorption of 3.1 mg of $N_{total}$/g of adsorbent.

Example 5

With the adsorbing material MOF MIL-101-Cr—$Mg^{2+}$ from Example 3, activated as described in Example 1, the equilibrium adsorption capacity test was carried out following the same methodology from Example 2, using a mixture of 75% of SRGO and 25% of LCO, with a $N_{total}$ content of 325 mg of N/Kg.

The result was a reduction of Nitrogen content in the equilibrium mixture of 83.3%, showing a capacity adsorption of 3.1 mg of $N_{total}$/g of adsorbent.

Example 6

Preparation of Extrudates

The adsorbing materials MOF MIL-101-Cr and MOF MIL-101-Cr—$Mg^{2+}$, synthesized as described by Examples 2 and 3, respectively, both as powders, as obtained in their syntheses and shown in FIG. 2, were submitted independently to the following process:

The adsorbing material was ground until producing fine particles, which were mixed with 6 wt. % of Carboxymethylcellulose (CMC) up to homogenization; the obtained solid mixture was peptized with bidistilled water with a ratio of 1.5 ml of bidistilled water/g of solid mixture; the obtained homogeneous paste was introduced into the extruding recipient of the GEA PHARMA SYSTEM equipment and the revolutions per minute necessary for the rotors in the container were programmed to reach the required torque (~25%) to carry out the extrusion process slowly until using the whole process material; the obtained extrusion material was dried in an oven at 120° C. for 12 hours; cylinders with 1-mm diameters were cut to obtain a length of 2 mm.

Figure 3:
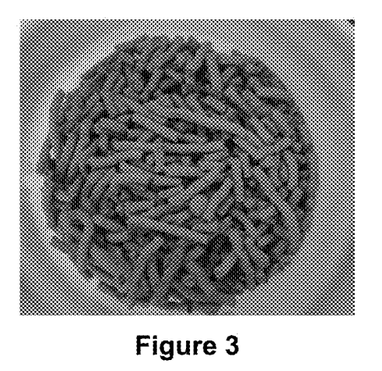
FIG. 3. MOF material MIL-101-Cr—$Mg^{2+}$ arranged as agglomerated cylinders with Carboxymethylcellulose (CMC).
Figure 4:
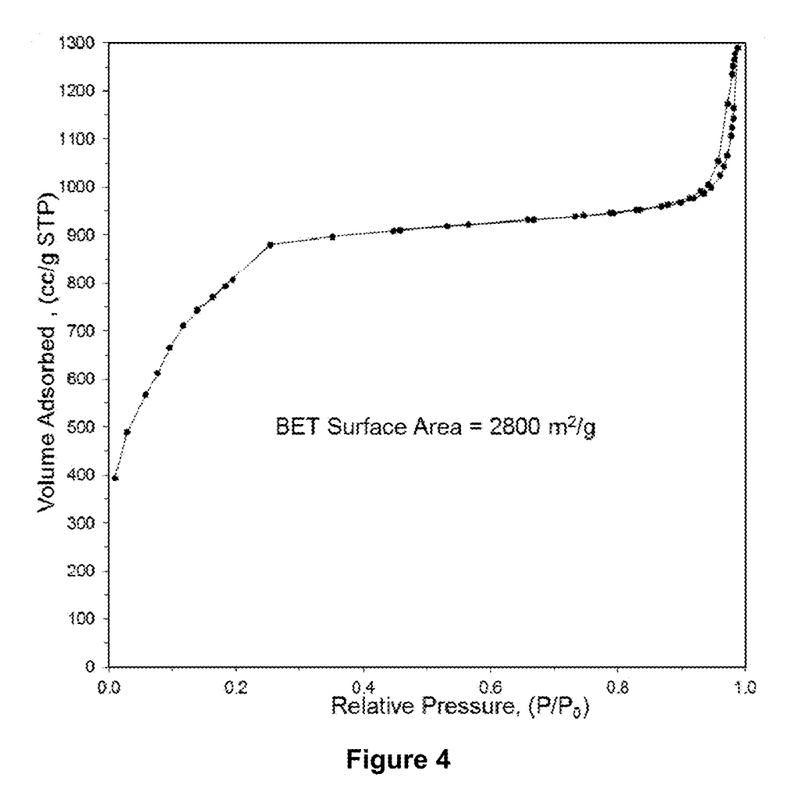
FIG. 4. $N_2$ adsorption isotherm corresponding to the MOF material MIL-101-Cr—$Mg^{2+}$ arranged as extrudates with Carboxymethylcellulose (CMC), Example 6.

According to the BET method, the obtained material MOF MIL-101-Cr-$Mg^{2+}$ arranged as agglomerated cylinders with Carboxymethylcellulose (CMC) and that are shown in FIG. 3, displayed the following characteristics: a surface area of 2,800 $m^2/g$; from the adsorption isotherm, FIG. 4, it was that the material possesses mesoporosity.

In this sense, it is important to mention that mesoporosity is a very important property for the selective adsorption processes in liquid phase, which take place at ambient temperature, which is the case, but not limitant of the selective adsorption of nitrogen compounds present in gas-oil.

Example 7

With the adsorbing material MOF MIL-101-Cr—$Mg^{2+}$ in the form of extrudates, the present invention process was carried out in fixed bed and continuous flow; for this purpose, the experimental system shown in FIG. 1 was designed and constructed.

2.5 g of adsorbing material were packed as extrudates in the microplant column, FIG. 1. The dimensions of the employed bed were 1 cm in internal diameter and 20 cm in length (volume=15.7 ml).

Pretreatment:

As done with the powdered material, the adsorbing material has to be activated before performing the adsorption process. Once the column was loaded with the adsorbent, this one was integrated to the microplant and placed inside a convection oven. A nitrogen current was passed at a flow rate from 50 to 60 ml/min through the column, and the oven heating program was started until reaching 120° C., keeping this temperature for 12 hours to remove humidity and volatile adsorbent impurities, after which it was cooled down until 25° C. to start the adsorption process.

Adsorption Process

The following loads were used separately to assess the performance of the MOF MIL-101-Cr—$Mg^{2+}$ material in packed bed:

Load 1.—SRGO=285 ppm $N_{total}$,
Load 2.—90 vol. % SRGO/10 vol. % LCO=301 ppm $N_{total}$, and
Load 3.—80 vol. % SRGO/20 vol. % LCO=321 ppm $N_{total}$;

The flow was ascending in the packed column by means of a peristaltic pump with a space velocity (LHSV) of 0.8 $h^{-1}$. The effluent at the exit of the packed column was collected regularly and the total nitrogen was analyzed by means of the Chemiluminescence model Antek Multitek analyzer.

Figure 5:
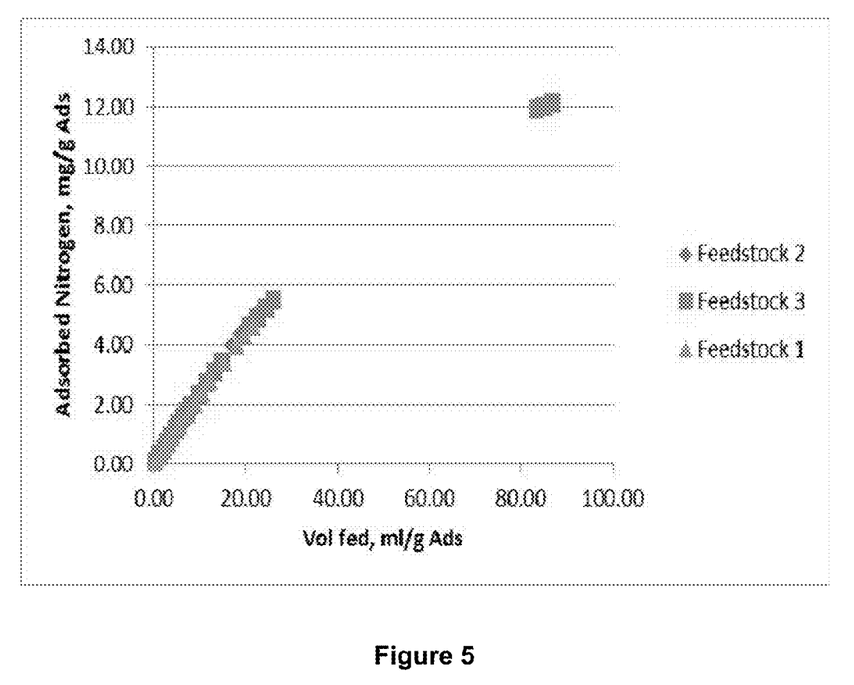
FIG. 5. Adsorption capacity of total Nitrogen per gram of MOF MIL-101-Cr—$Mg^{2+}$ as extrudates and in constant flow adsorption column, LHSV=0.8 $h^{-1}$, Example 7.

The results of the adsorption capacity of MOF MIL-101-Cr—$Mg^{2+}$ are shown in FIG. 5, where it can be observed that its adsorption capacity was not affected by the load composition. This fact indicates that the material MOF MIL-101-Cr—$Mg^{2+}$ not only is capable of treating SRGO, but also that the load can contain up to 20 vol. % of LCO, being this a very important result in terms of the process economy.

Example 8

Simple Regeneration Process of the Adsorbing Material MOF MIL-101-Cr—$Mg^{2+}$

In order to reestablish the adsorption capacity of the adsorbing material MOF MIL-101-Cr—$Mg^{2+}$ once the adsorption process is finished, which was suspended when the effluent total nitrogen content was equal to 40% of the feeding current, the packed bed with the adsorbing material MOF MIL-101-Cr—$Mg^{2+}$ was submitted to a simple regeneration process, where the hydrocarbons adsorbed in the packed bed were extracted with a polar solvent (Acetone). The column specifications are the following:

| | |
|---|---|
| Height, cm | 40.5 |
| Diameter, cm | 2.6 |
| Cross sectional area, $cm^2$ | 5.3 |
| Volume, $cm^3$ | 215 |
| Adsorbing material mass, g | 35 |
| Packed-bed density, g/ml | 0.16 |

Adsorption temperature: 30° C.
LHSV: 1.0 $h^{-1}$
Load: SRGO/LCO/CGO (60/25/15 wt. %, respectively)
Total Nitrogen: 458 mg/kg
Total Sulfur: 1.81 wt. %

Once the adsorption process was concluded, the regeneration process was carried out, which consisted of the following sequential stages:
a) Drainage,
b) Extraction with 500 ml of polar solvent (Acetone), and
c) Drying with Nitrogen gas at 80° C.

The mass balance with this regeneration procedure is shown in Table No. 1.

TABLE NO. 1

Mass balance in the simple regeneration process
The extract is the residue that is obtained after distilling Acetone

| | Load | Product | Drainage | Extract |
|---|---|---|---|---|
| Amount, grams | 1050.0 | 884.0 | 81.0 | 102.6 |
| Total Nitrogen, mg/kg | 458 | 87 | 402 | 3150 |

Example 9

Combined Regeneration Process of the Adsorbing Material MOF MIL-101-Cr—$Mg^{2+}$ In order to reduce the nitrogen concentrated residue, obtained after recovering the polar solvent by distillation, the regeneration process was modified, which was applied to the adsorbing material MOF MIL-101-Cr—$Mg^{2+}$ after performing the packed column adsorption process, intercalating an extraction stage with a non polar solvent (Hexane) prior to the extraction stage with polar solvent (Acetone), to maximize the recovery of adsorbed hydrocarbons with a total nitrogen content that allows the recirculation to the load tank. The load flow was interrupted when the content of total nitrogen in the effluent was 40% of the one corresponding to the feed load. The characteristics of the adsorption column and the operation conditions are the same mentioned in Example 8.

Once the adsorption process was finished, the regeneration process was executed, which consisted of the following sequential stages:
a) Drainage,
b) Extraction with 250 ml of non polar solvent (Hexane),
c) Extraction with 500 ml of polar solvent (Acetone), and
d) Drying with Nitrogen gas at 80° C.

The mass balance with this regeneration process is shown in table No. 2.

TABLE NO. 2

Mass balance in the combined regeneration process
Extract 1 is the one obtained from the extraction with Hexane, and
Extract 2 is the residue that is obtained after distilling Acetone

|  | Load | Product | Drainage | Extract 1 | Extract 2 |
|---|---|---|---|---|---|
| Amount, grams | 1041.0 | 882.5 | 80.4 | 90.1 | 13.3 |
| Total Nitrogen, mg/kg | 458 | 87 | 402 | 261 | 25900 |

Example 10

Figure 6:
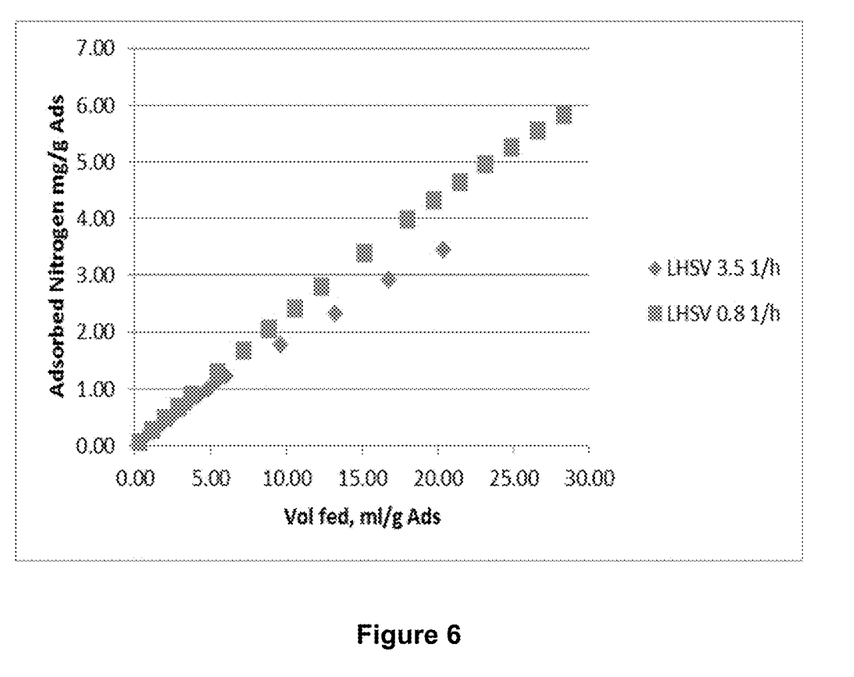
FIG. 6. Nitrogen removal percentage vs. number of cycles, Example 10.

Long Term Test to Establish the Adsorption Capacity of the Material MOF MIL-101-Cr—$Mg^{2+}$ after Multiple Adsorption-Regeneration Cycles Following the same procedure in Example 7, but packing 0.1562 g of the adsorbing material MOF MIL-101-Cr—$Mg^{2+}$ in the form of extrudates from Example 3, in a column with a volume of 1 ml (1 cm in length and 0.1562 cm in internal diameter). In this case, consecutive tests were carried out to study the material regeneration feasibility by washing with acetone. In each case, approximately 3.4 ml (2.9 g) of a SRGO load (286 ppm of N) were passed at an LHSV of 0.8 $h^{-1}$. 2.2 ml of product were recovered, and 0.5 ml (0.4 g) were drained. The extraction of nitrogen compounds was carried out passing 10 ml of acetone at a flow of 1 ml/min, with further drying of the adsorbing material by means of nitrogen flow (50 ml/min, 15 min, 9 kg/$cm^2$). This procedure was repeated until completing 280 adsorption-regeneration cycles, the result of the regenerations is shown graphically in FIG. 6, where it is observed that after 280 adsorption-regeneration cycles, the adsorbing material preserves its original adsorption capacity.

Example 11

Preparation of HDS Load:

In order to examine how the performance of the HDS catalysts is affected after reducing the NOC's content in a SRGO current, an HDS load was prepared as follows:
1) 215 ml of adsorbing material MOF MIL-101-Cr—$Mg^{2+}$ in the form of cylinders with 0.8 mm in diameter and 2 mm in length were packed in a Pyrex glass column;
2) 1,100 ml of SRGO with 285 ppmw of total Nitrogen were fed to the packed column, which was kept at 25° C., at a flow of 215 ml/h;
3) After completing step 2), the combined regeneration process described in Example 11 was performed;
4) Steps 2) and 3) were repeated until completing a total of 8,000 ml of treated PLG, which were analyzed in a Chemiluminescence model Antek Multitek equipment, obtaining a total Nitrogen content of 57 ppmw, for a reduction of 80%.

Example 12

Pretreated HDS Load:

In order to show the positive impact of introducing a gasoil load pretreated with the adsorbing material MOF MIL-101-Cr—$Mg^{2+}$, by means of the selective adsorption process featured in the present invention, on the HDS process, gasoil HDS experimental runs were performed in a microreaction system with two parallel reactors.

In the first reactor, a SRGO feedstock without previous treatment with 285 mg of total Nitrogen/Kg of SRGO was used whereas in the second reactor, gasoil was used as a load with previous treatment, using the present invention process, under given conditions that the content of total Nitrogen was 57 mg/Kg of SRGO.

Figure 7:
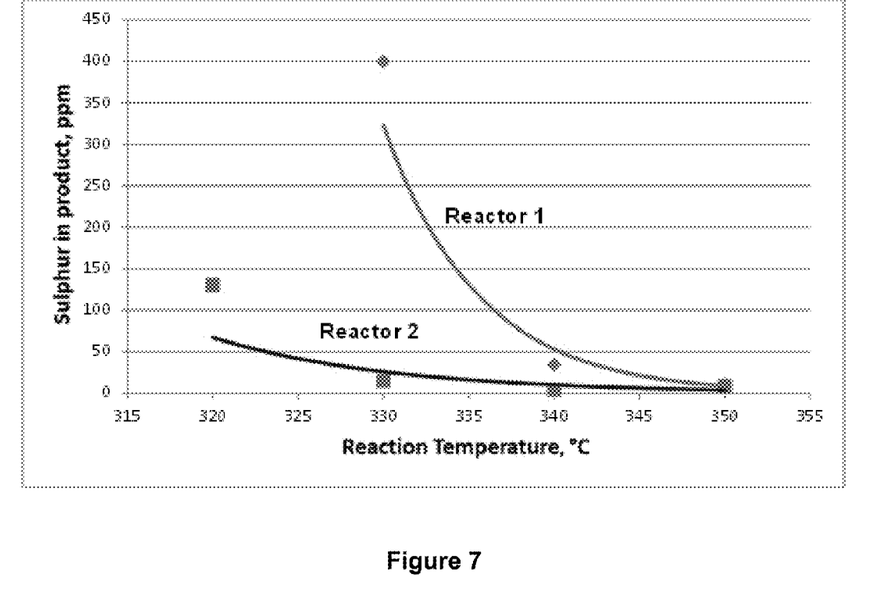
FIG. 7. Hydrodesulfurization effect on a SRGO current treated by the present invention process, selective adsorption of NOC's, Example 12.

The HDS reaction conditions were the same in both reactors, keeping the space velocity (LHSV=1.5 $h^{-1}$), Hydrogen pressure ($P_{H2}$=56 Kg/$cm^2$) and a Hydrogen/Oil ratio of 442 std l/l oil constant. The runs were carried out at three different reaction temperatures, 330, 340 and 350° C., respectively. The catalyst volume in each reactor was the same (7.5 ml) and the used catalyst was the same in both reactors. The obtained results are shown in FIG. 7, where a sharp difference between the behavior patterns of both reactors with respect to the Sulfur content diminution in the products of the HDS process in each reactor is observed.

Tests were carried out in an HDS microplant, which is equipped with two parallel microreactors, each equipped with its own instrumentation to control the operation conditions independently.

Each reactor was loaded with 7.5 ml (8.19 g) of the same commercial catalyst commonly used in units used to obtain ultra-low-sulfur diesel (ULSD below 15 ppm).

In a first experimental run, the following operation conditions were fixed:
Load flow: 11.25 ml/h (LHSV=1.5 $h^{-1}$)
Pressure: 56 kg/$cm^2$
$H_2$/Oil ratio: 442 std l/l
Temperature: 330, 340 and 350° C., respectively.
Varying only the feedstock of each reactor:
Reactor 1
Load: SRGO without previous treatment (285 ppmw of total Nitrogen, 12,570 ppmw of total Sulfur)
Reactor 2
Load: SRGO with previous treatment with adsorbing material MOF MIL-101-Cr—$Mg^{2+}$ (57 ppmw of total Nitrogen, 12, 570 ppmw of total Sulfur)

The measurement of total Sulfur in the loads and products was performed daily in a Chemiluminescence model Antek Multitek equipment, waiting for its stabilization before changing the reaction temperature.

Table No. 3 shows that the total Sulfur content in the product samples for each reactor and each reaction temperature:

TABLE NO. 3

Total Sulfur content in product with untreated load (Reactor 1) and with treated load (Reactor 2)

| Reaction temperature, | Total Sulfur, ppmw | |
|---|---|---|
| ° C. | Reactor 1 | Reactor 2 |
| 330 | 400.1 | 14.9 |
| 340 | 34.7 | 8.9 |
| 350 | 10.9 | 4.3 |

As observed in Table No. 3, the present-invention process helps diminish the reaction temperature in the HDS process in 20° C., keeping the ULSD specifications (<15 ppmw), which means a considerably longer HDS catalyst lifespan.

Example 13

In order to show convincingly the impact of reducing the NOC's content in the load currents for the HDS process for the production of ultra-low-sulfur diesel (ULSD below 15 ppm), tests like those described in Example 12 were carried out, but with a more-difficult-to-be-hydrodesulfurated load. The conditions in each reactor were as follows:

Reactor 1
Load: SRGO/LCO/CGO mixture with a proportion of 60/25/15 in weight without previous treatment (458 ppmw of total Nitrogen, 18,100 ppmw of total Sulfur)
Load flow: 7.5 ml/h (LHSV=1.0 h$^{-1}$)
Hydrogen pressure: 56 kg/cm$^2$
H$_2$/PLG ratio: 442 std l/l
Temperature: 320, 330 and 340° C., respectively.

Reactor 2
Load: SRGO/LCO/CGO mixture with a proportion of 60/25/15 in weight with previous treatment (92 ppmw of total Nitrogen, 18,100 ppmw of total Sulfur)
The rest of the conditions were the same as those for Reactor 1.

Figure 8:
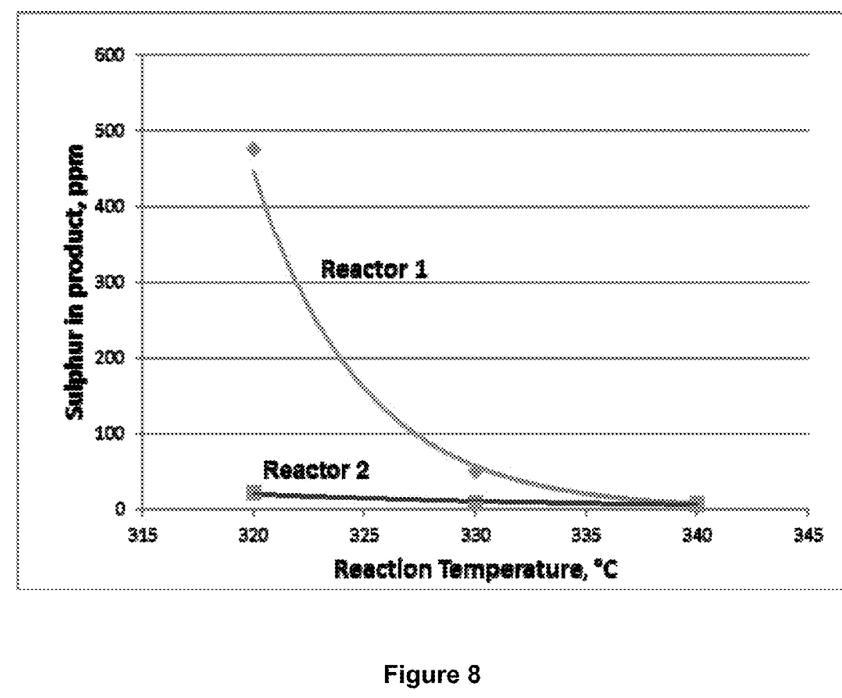
FIG. 8. Hydrodesulfurization effect on a SRGO/LCO/CGO current treated by the present invention process, selective adsorption of NOC's, Example 13.

The obtained results are shown in Table No. 4 and graphically in FIG. 8.

TABLE NO. 4

Total Sulfur content in product with untreated load (Reactor 1) and with treated load (Reactor 2)

| Reaction temperature, ° C. | Total Sulfur, ppmw | |
|---|---|---|
| | Reactor 1 | Reactor 2 |
| 320 | 477 | 22 |
| 330 | 50 | 9 |
| 340 | 8 | 7 |

What is claimed is:

1. A selective adsorption process for reducing the content of nitrogen organic compounds (NOC's) in diesel hydrotreating (HDT) loads comprising the following stages:
   I. loading extrudates obtained from powdered adsorbent materials of MOF MIL-101-Cr-M$^{X+}$, where M$^{X+}$ is a metal cation selected from the group consisting Mg$^{2+}$, Al$^{3+}$ or Ti$^{4+}$ in a fixed-bed-column;
   II. contacting the diesel hydrotreating load with said extrudates of said powdered absorbent materials MOF MIL-101-Cr-M$^{X+}$ for selective adsorption of nitrogen compounds at ambient temperature, atmospheric pressure and without using nitrogen to reduce the content of nitrogen organic compounds (NOC's) present in the diesel hydrotreating load; and
   III. regenerating used extrudates of said powdered absorbent materials MOF MIL-101-Cr-M$^{X+}$.

2. The process of claim 1, where stage I consists of:
   a) grinding a MOF MIL-101-Cr-M$^{X+}$ solid powder obtained from a metal-organic synthesis to produce particles;
   b) adding an organic binder to the particles of MOF MIL-101-Cr-M$^{X+}$, where said organic binder is selected from the group consisting of carboxymethylcellulose (CMC), hydroxyethylcellulose, and xanthan gum to obtain a homogenized solid mixture;
   c) peptizing the homogenized solid mixture with water in a ratio from 1.3 to 1.7 ml/g of the homogenized solid mixture to obtain a homogeneous paste;
   d) introducing the homogeneous paste to an extruder;
   e) setting of the angular velocity of rotors in the extruder from 20 to 30% of a maximum velocity;
   f) extruding the material to obtain extrudates;
   g) drying the extrudates at temperatures from 100 to 140° C. for 10 to 14 hours; and
   h) sieving of the obtained extrudates to a desired size.

3. A process according to claim 2, where the organic binder is added in an amount of from 4 to 8 wt. % based on the weight of the particles.

4. A process according to claim 2, where the organic binder is carboxymethylcellulose (CMC).

5. A process according to claim 2, where bidistilled water is used in the peptization of the homogenized solid mixture.

6. A process according to claim 2, where the ratio of water to solid mixture used in the peptization of the homogenized solid mixture is from 1.4 to 1.6 ml/g.

7. A process according to claim 2, where the diameter of the extrudates is from 0.8 to 1.3 mm.

8. A process according to claim 2, where the sieving of the extrudates is carried out to obtain a particle size from 1 to 2 mm in length.

9. A process according to claim 1, where the extrudates are in the form of cylinders.

10. A process according to claim 1, where the extrudates have a BET specific surface area of 2, 600 to 3,000 m$^2$/g.

11. A process according to claim 1, where stage II consists of:
    a) activating the MOF MIL-101-Cr-M$^{X+}$ extrudates loaded in the fixed bed column using a convection oven with a nitrogen current flow from 10 to 100 ml/min, through the fixed bed column, starting an oven heating program until reaching temperatures from 110 to 130° C., maintaining the temperature for 4 to 12 hours; afterwards, cooling the resulting extrudates to temperatures from 20 to 30° C.; and
    b) Feeding of the diesel hydrotreating load to be treated, by ascending or descending flow, to the fixed bed column using a peristaltic pump with a space velocity (LHSV) of up to 12 h$^{-1}$; periodic recollection of effluent at an outlet of the fixed bed column and analysis of total nitrogen corresponding to recollected fractions.

12. A process according to claim 11, where the nitrogen current in the activation step of the MOF MIL-101-Cr-M$^{X+}$ extrudates, is a flow from 50 to 60 ml/min.

13. A process according to claim 11, where the diesel hydrotreating load in step b) of stage II is supplied at a space velocity (LHSV) ranging from 0.5 to 1.5 h$^{-1}$.

14. A process according to claim 1, where the diesel hydrotreating load treated in stage II, is obtained by distillation of a hydrocarbon stream at a temperature ranging from 150 to 400° C.

15. A process according to claim 1, where the hydrotreating load being treated in stage II, is selected from the group consisting of Straight Run Gasoil (SRGO), Light Cycle OIL (LCO), Coker Gasoil (CGO), gasoline, diesel and jet fuel, and mixtures thereof.

16. A process according to claim 1, where stage III consists of:
    a) draining effluent from said fixed bed column;
    b) extracting the extrudates of the powdered absorbent material with a non-polar solvent extraction, and distilling the solvent to obtain a recovered fraction in an amount of from 9 to 11% by volume and returning the recovered fraction to a load tank of the adsorption process; where the solvent/powdered absorbent material ratio is from 3 to 7 ml/g;
    c) In situ extraction of the powdered absorbent material from step b) at ambient temperature with a polar solvents at a solvent/powdered absorbent material ratio from 5 to 15 ml/g; separating the polar solvent by distillation to obtain a residue in an amount of 0.8 to 1.3% by volume with a total nitrogen content from 2 to 3 wt. %;

d) Column drying the extrudates of the powdered absorbent material by passing a nitrogen flow at a temperature from 80 to 120° C. to eliminate completely the polar solvent.

17. A process according to claim 16, where the nonpolar solvent in step b) of stage III, is selected from $C_3$ to $C_8$.

18. A process according to claim 16, where the polar solvents in step c) of stage III, are selected from the group consisting of ketones, alcohols and amides.

19. A process according to claim 16, where the polar solvent in step c) of stage III, is acetone.

20. A process according to claim 16, where the nitrogen in step d) of stage III is dry.

* * * * *